United States Patent [19]
Tam

[11] Patent Number: 5,134,894
[45] Date of Patent: Aug. 4, 1992

[54] INERTIAL MASSES MEDIATED ROTATIONAL ENERGY COUPLER

[76] Inventor: Isaac Y. Tam, 470 Americano Way, Fairfield, Calif. 94533

[21] Appl. No.: 767,823

[22] Filed: Sep. 30, 1991

[51] Int. Cl.$^5$ .............................................. F16H 33/02
[52] U.S. Cl. ........................................ 74/64; 475/267
[58] Field of Search ............................. 74/64; 475/267

[56] References Cited

U.S. PATENT DOCUMENTS

| | | | |
|---|---|---|---|
| 2,149,560 | 3/1939 | Teece et al. | 475/267 X |
| 2,984,124 | 5/1961 | Keyser | 475/267 X |
| 3,581,584 | 6/1971 | Williams | 74/64 |
| 3,877,252 | 4/1975 | Kobayashi | 475/267 |
| 4,336,870 | 6/1982 | Shea | 74/64 X |
| 4,742,722 | 5/1988 | Wallace | 74/64 |

FOREIGN PATENT DOCUMENTS 548975 11/1942 United Kingdom ................. 475/267

*Primary Examiner*—Allan D. Herrmann

[57] ABSTRACT

A rotational energy coupler generally regarded to as a transmission is described, wherein rotational energy is transmitted through inertial media. An input unit transmits rotational energy to a set of inertial masses by driving the inertial masses to gyrate. An output unit recovers rotational energy from the gyrating inertial masses by altering their natural travelling paths through a guiding system that guides the gyrating inertial masses into paths along which the distance to the axis of rotation of the output unit is not constant. As a result, an unidirectional torque is generated on the output unit. If the output unit rotates, rotational energy is consumed, if not, rotational energy is conserved. The magnitude of the torque so generated is related to the rotation rate difference between the input unit and the output unit in an exponential manner, namely: the magnitude of the torque is proportional to the square of the rotation rate difference. The range of the magnitude of the torque is much wider than the range of the rate difference. The guiding system of the output unit has an unique feature of having no tangible track to guide the inertial masses so as to reduce friction. The output torque is unidirectional so that one-way clutches that convert oscillating torque into unidirectional torque are unnecessary.

11 Claims, 8 Drawing Sheets

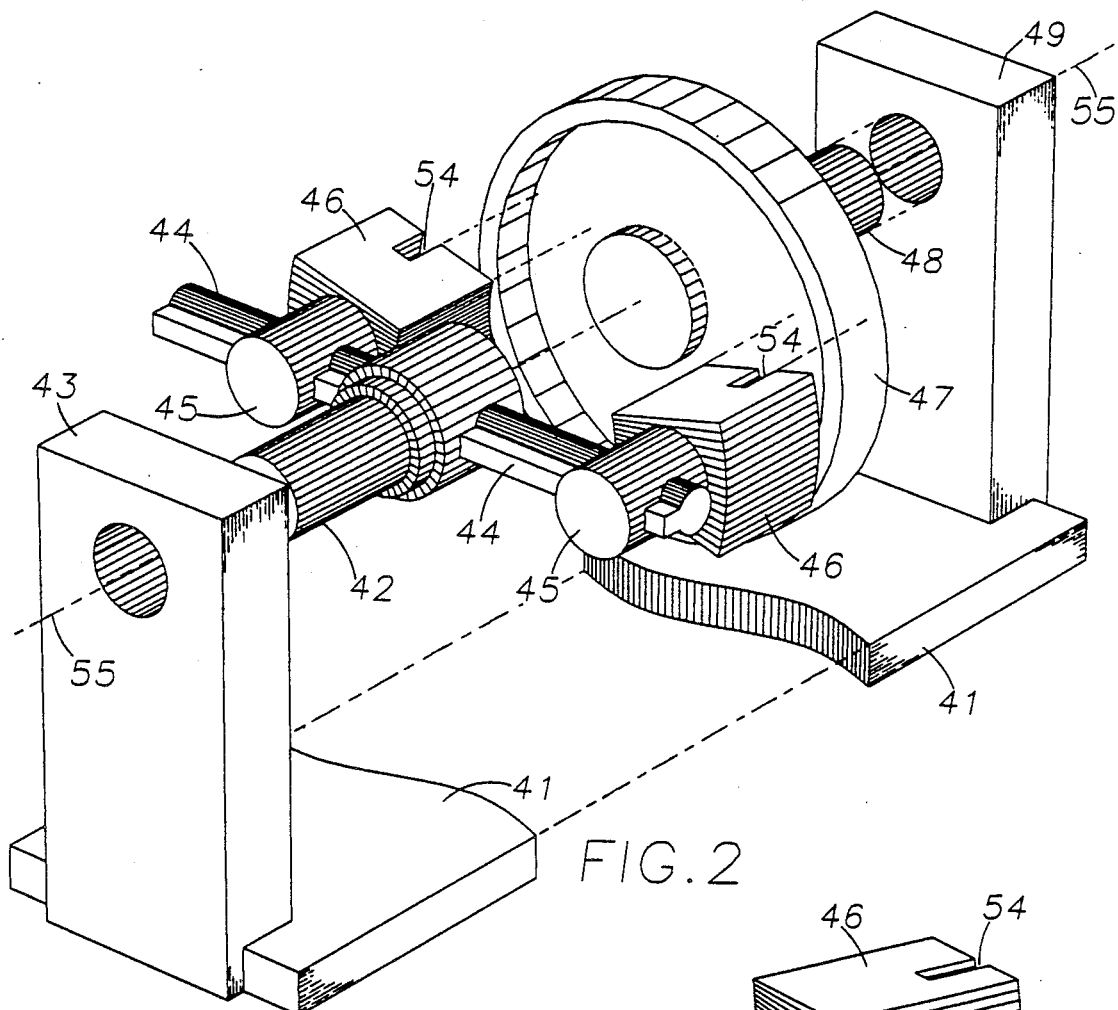
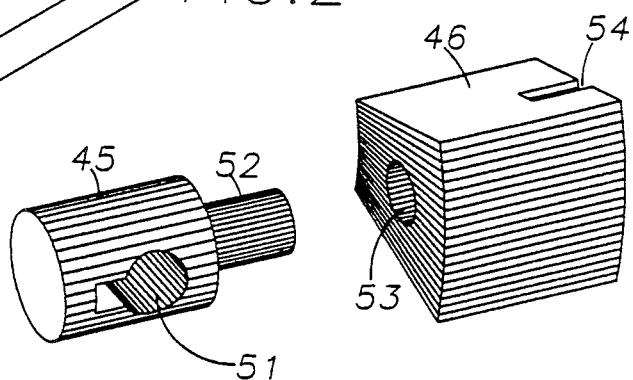
FIG.2
FIG.3     FIG.4

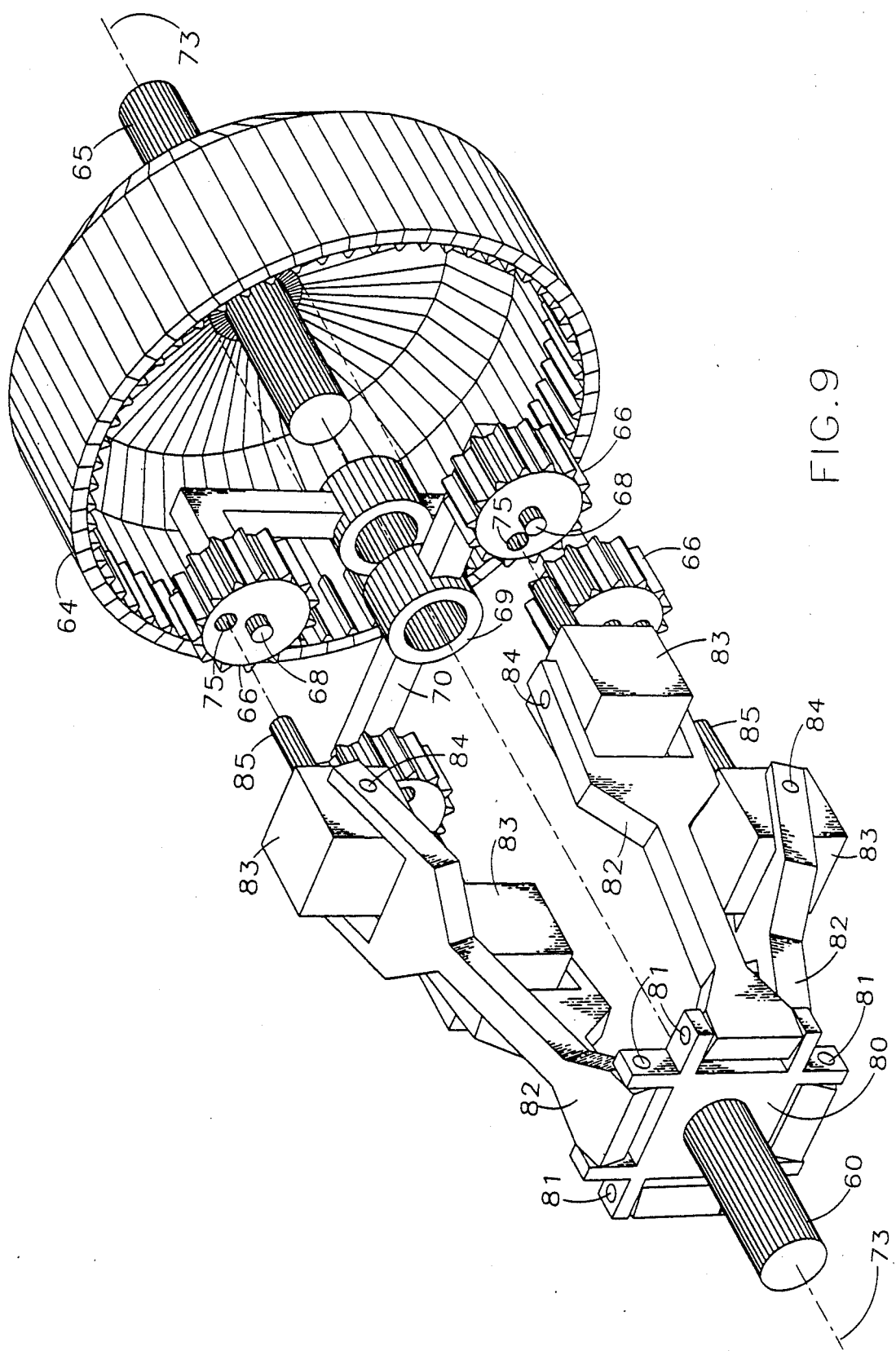

INERTIAL MASSES MEDIATED ROTATIONAL ENERGY COUPLER

BACKGROUND-FIELD OF INVENTION

The present invention relates to torque converters and transmissions, specifically to automotive torque converters and transmissions that utilize gyrating inertial masses.

BACKGROUND-CROSS REFERENCE TO RELATED APPLICATIONS

The present application is related to my application filed on Sep. 1, 1988, entitled INERTIA TORQUE CONVERTER/TRANSMISSION, having a Ser. No. of 07/239,608, abandoned due to lack of detail in specifications.

BACKGROUND-DISCUSSION OF PRIOR ART

Heretofore automotive torque converters and transmissions are overly complicated, inefficient, difficult to use in some cases, and expensive to manufacture and maintain. Traditional geared transmissions cannot maintain at all times perfect matches between engines and loads. The so called continuously variable transmissions may provide a better match, but have other problems in durability and reliability. There were a few attempts to use gyrating masses to convert torque from a rotatable energy source to a rotatable load, but the designs are unnecessarily complicated and inefficient, due to a lack of understanding of the exact mechanism of the conversion of torque by gyrating masses. One of such attempts is disclosed in U.S. Pat. No. 4,742,722 issued to Wallace in 1988, which discloses an inertial transmission using gyrating inertial masses. The disclosure explains how torque is converted to angular velocity and how angular velocity is converted to torque within one object, but never explains in full how torque is transmitted from one object to another, i.e. from the input shaft to the output shaft. It is obvious that the mechanism of transmitting torque from one object to another through gyrating masses was not fully understood. This lack of understanding produces a machine that is inefficient and overly complicated, exemplified by complicated and unnecessary three-dimensional movements of inertial masses, complicated and inefficient crank links, and unnecessary one-way clutches. Furthermore, the quantitative relationship between the output torque and input rate of rotation is not established.

Another attempt to utilize gyrating masses in a transmission is disclosed in U.S. Pat. No. 4,336,870 issued to Shea in 1982, which describes a torque exchange coupling for transmitting rotational mechanical power, wherein a set of gyrating extendable members of inertial nature are used to generate torque on a solid track which, through its contact surface, is contacted by the extendable members. Using a solid track is not the best way to derive torque from gyrating masses because of friction between the solid track and the gyrating masses. Furthermore, the extendable members will bounce back from the contact surface of the solid track and the machine will not operate smoothly.

Still another attempt to utilize gyrating masses in a torque converter is disclosed in U.S. Pat. No. 3,581,584 issued to Williams in 1971, which describes a torque converter that utilizes gyrating masses to generate oscillating torque. This oscillating torque is in turn converted into an one-directional torque through an one-way clutch, and applied to a load. Again, this is a case where lack of understanding of how torque is transmitted through gyrating masses leads to a design that is overly complicated and inefficient. If the device was properly designed and constructed, the one-way clutch would not have been necessary.

Unless the mechanism of transmission of torque through gyrating masses is fully understood, a simpler and more efficient design is impossible. The mechanism of such a transmission of torque will be explained in detail later in this application.

OBJECTS AND ADVANTAGES

It is an object of this invention to provide a transmission which is simple, rugged, practical, and easy to manufacture.

It is another object of this invention to provide a transmission which is extremely efficient with minimal heat loss.

It is still another object of this invention to provide a transmission which does not shift between gears yet matches engine and load automatically.

It is still another object of this invention to provide a transmission which has a wide range of torque output.

It is still another object of this invention to provide a transmission wherein magnitude of torque output is very easy to manipulate. A desirable amount of torque can be obtained by simply adjusting engine rate of rotation.

It is still another object of this invention to provide a transmission wherein rotational energy is recyclable. Instead of generating heat, unused rotational energy is recycled. For example, rotational energy of a set of gyrating masses generates an adequate amount of torque to keep an automobile from rolling down a steep grade, yet since the automobile is not moving, rotational energy is not consumed, most of the rotational energy is recycled to continue generating torque, as a result, torque is maintained and the automobile is kept in place with very little energy consumed. This is not a perpetual movement. The operation is analogous to the gyration of a satellite, which keeps on producing centrifugal forces almost indefinitely. But in a down-to-earth environment where this rotational energy coupler operates, energy loss due to friction is inevitable, hence a continuous energy infusion is necessary. But unlike a frictional torque converter or a fluidic torque converter, friction here does not play any functional role.

SUMMARY OF THE INVENTION

The transmission disclosed is comprised of 3 parts: a rotatable input unit with drive arms mounted radially thereon; a set of inertial masses drivably coupled to the drive arms; and a rotatable output unit having trackless guiding means mounted thereon to guide said inertial masses to travel in a path along which the distance to the axis of rotation of the rotatable output unit varies.

There are two types of drive arms: sliding drive arms and swinging drive arms. The sliding drive arms are fixedly and radially mounted on the input shaft. The inertial masses are drivably and slidably coupled to the sliding drive arms so that they can slide along the length of the drive arms either inward or outward with respect to the axis of rotation of the input unit. To increase efficiency, the sliding drive arms can also be mounted in a way so that they tilt to the direction of rotation of the input unit, so that when the inertial masses slide outward they also slide forward.

The swinging drive arms are pivotally and radially mounted on the input shaft. The inertial masses are drivably coupled to the swinging drive arms so that together with the swinging drive arms they swing either outward or inward with respect to the axis of rotation of the input unit. To make it more efficient, the pivots that mount the swinging drive arms on to the input shaft are forwardly tilted so that when swinging outward the inertial masses also swing forward.

It is one of the novel features of this invention that there is no solid track to guide the inertial masses. The inertial masses are guided by guiding means mounted on the output unit, to follow intangible paths so as to keep friction to a minimum.

BRIEF DESCRIPTION OF THE DRAWINGS

FIG. 2 is a schematic, three-dimensional, exploded view of a workable example of the theory explained in FIG. 1.

FIG. 3 shows in detail a connecting device of the embodiment in FIG. 2.

FIG. 4 shows in detail an inertial mass of the embodiment in FIG. 2.

FIG. 9 is a schematic, three-dimensional, exploded view of first preferred embodiment having swinging drive arms, without showing a casing.

DETAILED DESCRIPTION OF THE INVENTION

Figure 1:
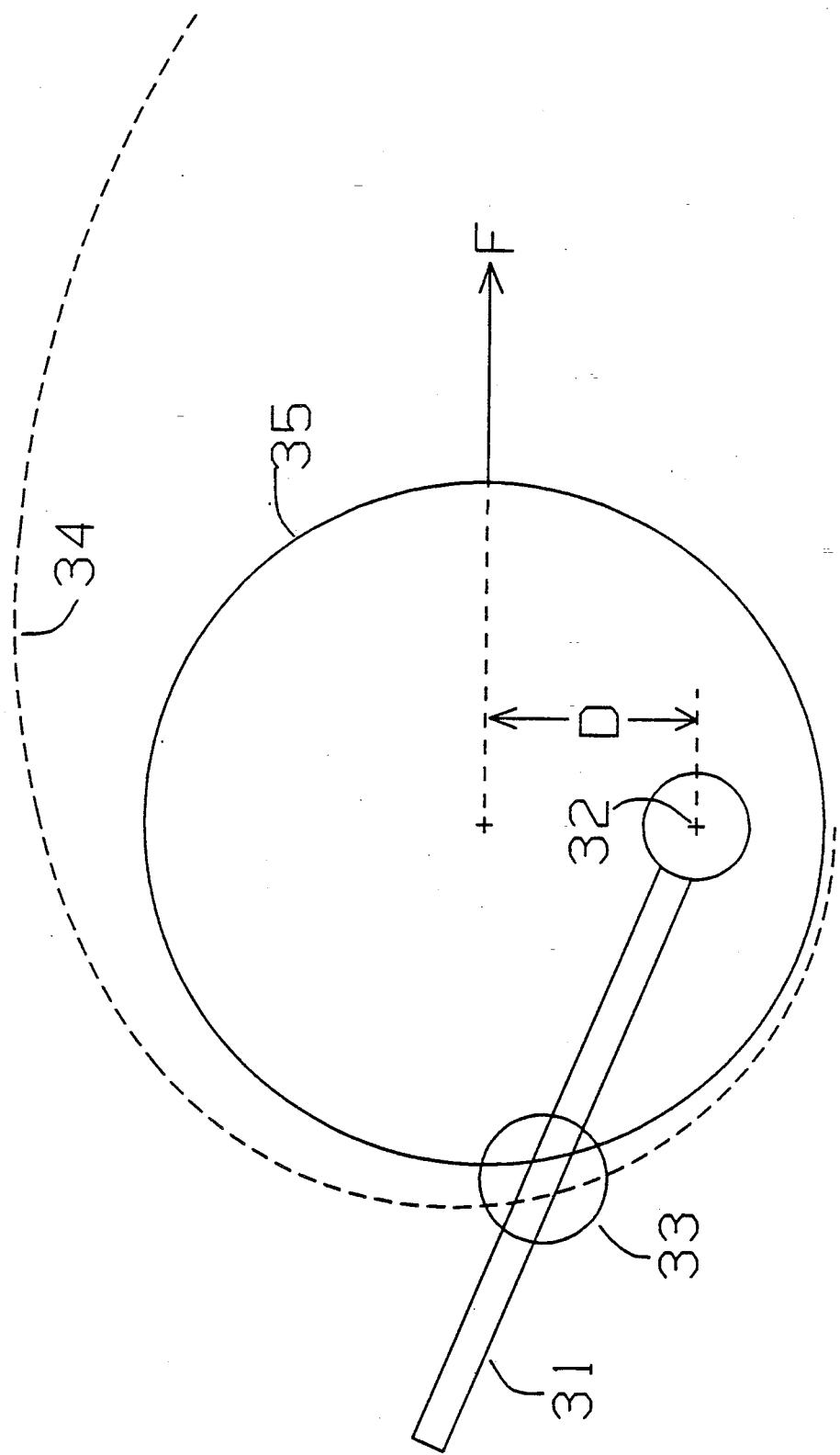
FIG. 1 explains the theory of how torque is generated by a gyrating inertial mass.

This invention is based on a theory illustrated in FIG. 1, wherein 31 is a drive arm, 32 is the axis of rotation of drive arm 31, 33 is an inertial mass slidably mounted on drive arm 31, 34 is a natural path of inertial mass 33 when driven by drive arm 31 without a guiding track, 35 is an eccentrically mounted circular guiding track to guide inertial mass 33. Track 35 does not exist in the preferred embodiments. It is incorporated here for the purpose of teaching the theory. Track 35 is also rotatable around axis of rotation 32. F is a net force exerted on track 35 by inertial mass 33. D is the distance between force F and axis of rotation 32.

Drive arm 31 is rotatable around its axis of rotation 32, inertial mass 33 is slidably mounted on drive arm 31 so that it can slide along the length of drive arm 31 either inward or outward with respect to axis of rotation 32. When drive arm 31 is driven by a rotational energy source (not shown) to rotate around its axis of rotation 32 in a clockwise direction, and when there is no guiding track to guide inertial mass 33, inertial mass 33 will follow a path depicted by a broken line 34 which is designated the natural path of inertial mass 33. When inertial mass 33 is forced into going an eccentrically circular path by eccentrically mounted circular track 35, the left half of circular track 35 substantially coincides with natural path 34 of inertial mass 33, while the right half of circular track 35 deviates markedly from natural path 34. It does not require much force to guide inertial mass 33 into going the left half of track 35, while much force is needed to guide inertial mass 33 into going the right half of track 35. As a result, there is a net reactive force F exerted on the right side of track 35 by inertial mass 33. A net torque is generated on track 35, with a magnitude equal to force F times distance D, represented by an equation T=FD where T is the net torque generated on guiding track 35, F is the net force exerted on guiding track 35 by inertial mass 33, D is the distance between force F and axis of rotation 32.

There is a misconception that leads to a conclusion that an unidirectional torque will not be generated the way described in FIG. 1. This misconception is that the right side and left side of the guiding track are symmetrical, if there is a force exerted on the right side of the track when the inertial mass travels through the right side of the track, there will also be a force with a same magnitude but opposite direction exerted on the left side of the track when the inertial mass travels through the left side of the track, and in average these two forces cancel out each other. According to this misconception, there will not be any continuous and unidirectional torque generated. Instead there will be a so called "oscillating torque" generated, because these two forces do not occur at the same time. Unless one-way clutches are used to convert this so called "oscillating torque" into unidirectional torque, this "oscillating torque" is useless. The prior art clearly has the misconception just described, evidenced by the utilization of one-way clutches. The reason for this misconception is that the prior art failed to recognize that although the left and right sides of the track are symmetrical, the effects of the inertial mass on these two sides of the track are not symmetrical. The inertial mass has far less effect on the left side of the track than has it on the right side of the track, because the left side of the track substantially coincides with the natural path of the inertial mass while the right side of the track substantially deviates from the natural path of the inertial mass, as explained above in FIG. 1.

The relationship between the magnitude of force F thus generated and the rate of rotation of inertial mass 33 is exponential, namely: the magnitude of force F is proportional to the square of the rate of rotation of inertial mass 33. If guiding track 35 also rotates, the magnitude of force F is proportional to the square of the rotation rate difference between inertial mass 33 and guiding track 35. A small change in rate of rotation of inertial mass 33 will cause a big change in magnitude of force F, for example, if track 35 is stationary, a 5-fold change in rate of rotation of inertial mass 33 will cause the magnitude of force F to change 25 folds, resulting in an extremely wide range of torque output.

The guiding track in FIG. 1 does not have to be circular in shape as long as along the track the distance to the axis of rotation varies. This is because of the fact that when said distance is increasing along the track, the shape of that part of the track is more conformed to the natural path of the inertial mass than when said distance is decreasing. Hence, the inertial mass has a greater force exerted on the track when travelling along the part of the track where distance to the axis of rotation is decreasing than when travelling on the part of the track where distance to the axis of rotation is increasing. As a result, an unidirectional torque is generated on the track around the axis of rotation. The theory can then be generalized as: when an inertial mass is driven by a drive arm to rotate around an axis of rotation and is forced into going a path along which the distance to the axis of rotation varies, an unidirectional torque is generated around the axis of rotation by the inertial mass on those that forces the inertial mass into the path, the torque thus generated having a magnitude proportional to the square of the rotation rate difference between the inertial mass and those that forces the inertial mass into the path.

FIG. 2 schematically shows a workable example of the theory in a three-dimensional, exploded manner. The embodiment in FIG. 2 is not a preferred embodiment because it is not dynamically balanced and it has a less efficient tangible track. It is cited here only to exemplify, and thus for better understanding of the above described theory. The embodiment in FIG. 2 is divided into three parts for ease of description. The first part is an input unit which comprises an input shaft 42 which is rotatably mounted on a casing 41 through a bearing 43, and is rotatable around an axis of rotation 55; and a pair of identical drive arms 44 radially and fixedly mounted on input shaft 42. The second part is the inertial media comprising a pair of identical inertial masses 46 and a pair of identical connecting devices 45 which drivably couple inertial masses 46 onto drive arms 44. The third part is an output unit which comprises an output shaft 48 which is rotatably mounted on casing 41 through a bearing 49, and is rotatable around axis of rotation 55; and a circular track 47 eccentrically and fixedly mounted on output shaft 48.

FIG. 3 shows a connecting device 45 in detail wherein 51 is a bore for slidably fitting connecting device 45 onto a drive arm 44, 52 is a cylindrical connecting shaft for rotatably mounting connecting device 45 onto an inertial mass 46.

FIG. 4 shows an inertial mass 46 in detail wherein 53 is a cylindrical bore for receiving cylindrical connecting shaft 52 of connecting device 45, 54 is an arc-shaped groove having a same curvature as the curvature of circular track 47. Through said arc-shaped groove 54, inertial mass 46 is snugly and slidably seated onto eccentrically mounted circular track 47.

Bore 51 on connecting device 45 has a non-circular cross-sectional shape substantially the same as the cross-sectional shape of drive arm 44, so that when fitted snugly and slidably onto drive arm 44, connecting device 45 does not rotate axially around drive arm 44.

Cylindrical connecting shaft 52 is integrated into connecting device 45 as an integral part thereof. The outer end of cylindrical connecting shaft 52 is fitted into cylindrical bore 53 to rotatably couple inertial mass 46 onto connecting device 45.

Since circular track 47 is eccentrically mounted, when sliding along circular track 47, the position of inertial mass 46 relative to a corresponding drive arm 44 keeps on changing both angularly and linearly. The function of connecting device 45 is to keep inertial mass 46 and said corresponding drive arm 44 travelling at a same angular speed, while accommodating different positional relationships between said inertial mass 46 and said drive arm 44.

Input shaft 42 imports rotational energy from a rotational energy source (not shown) and causes drive arms 44 to rotate around axis of rotation 55. Drive arms 44 in turn through connecting devices 45 drive inertial masses 46 to gyrate around axis of rotation 55. The path of inertial masses 46 is set forth by circular guiding track 47 which is eccentrically and fixedly mounted on output shaft 48. Since guiding track 47 is an eccentrically mounted circular track, said path will be an eccentric circle along which the distance to axis of rotation 55 varies. As a result an unidirectional torque is generated on guiding track 47 around axis of rotation 55, causing guiding track 47 and hence output shaft 48 to rotate around axis of rotation 55. Since this torque is unidirectional, it is exported directly through output shaft 48 to a load (not shown), without aid of one-way clutches.

Figure 6:
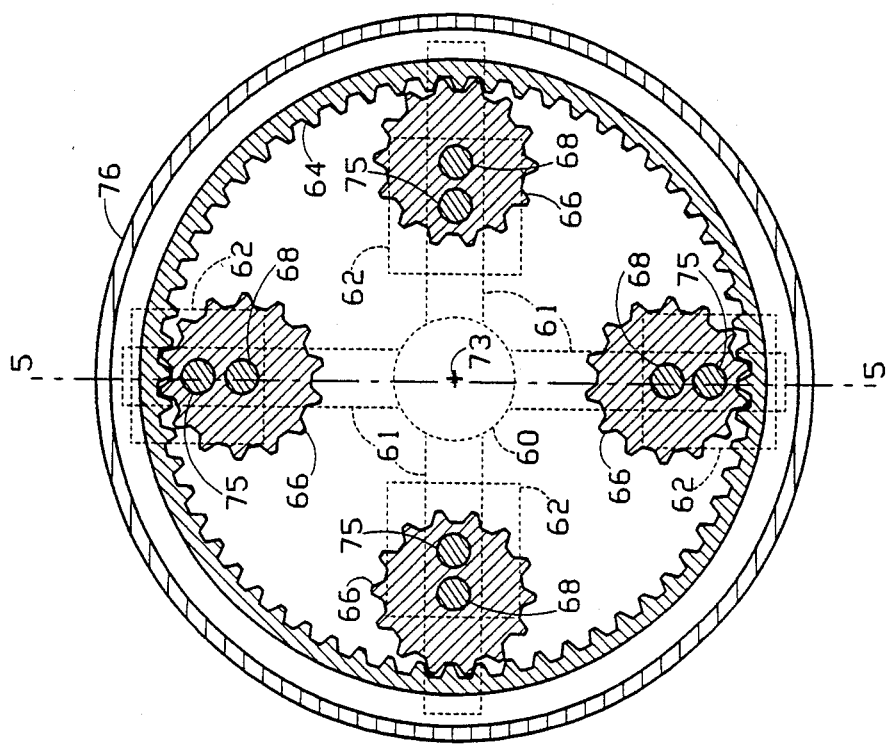
FIG. 6 shows a cross section of first preferred embodiment having sliding drive arms, taken from line 6—6 of FIG. 5.
Figure 5:
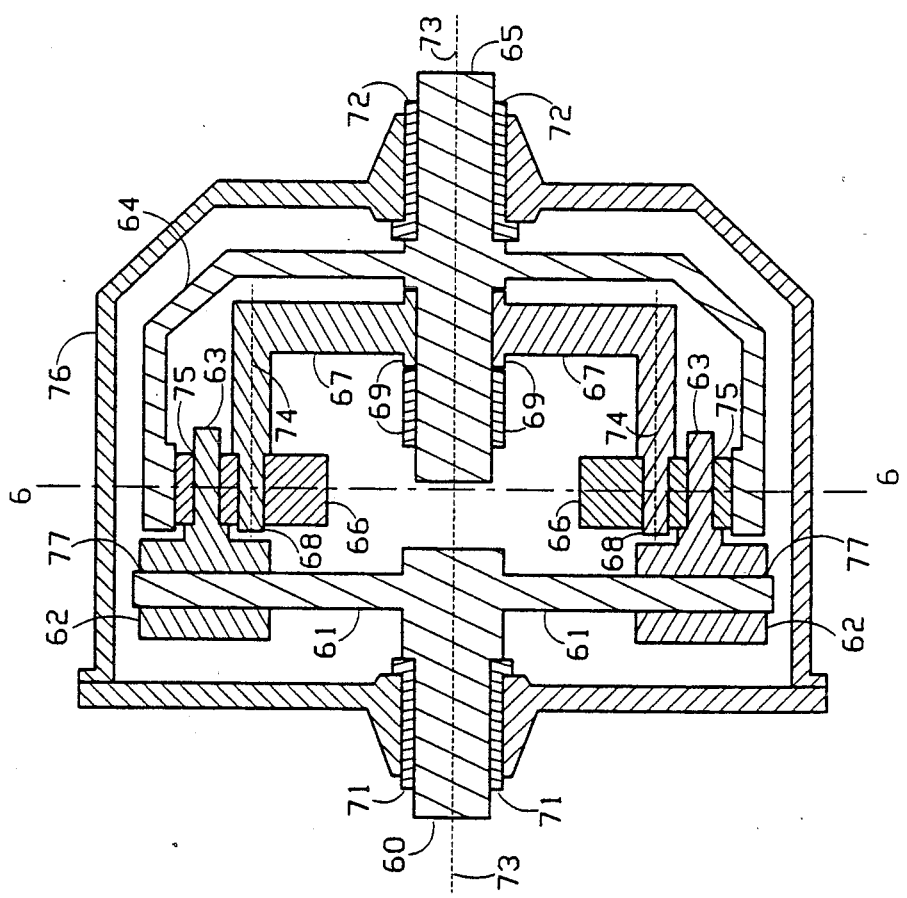
FIG. 5 shows a longitudinal section of first preferred embodiment having sliding drive arms, taken from line 5—5 of FIG. 6.
Figure 7:
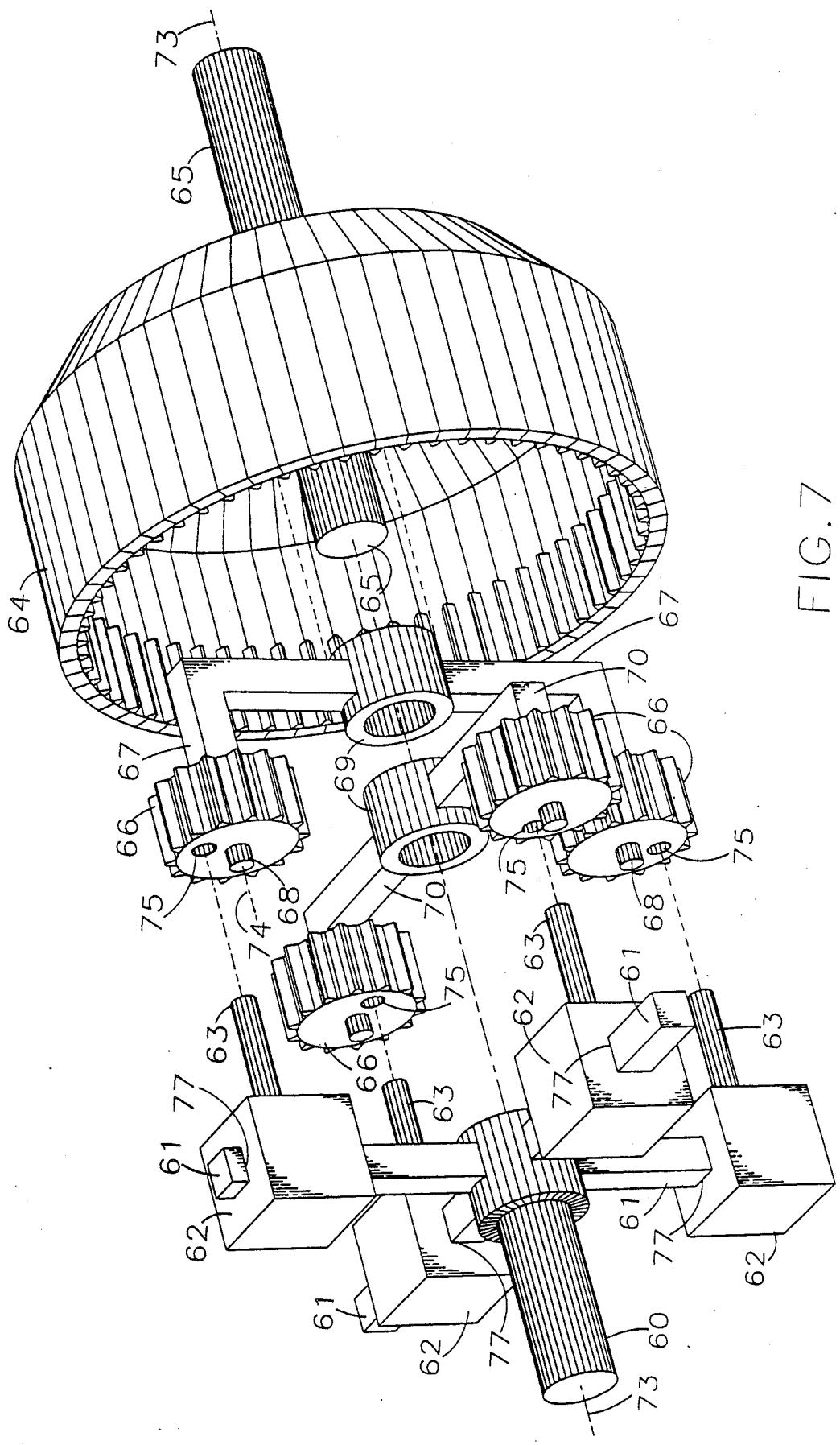
FIG. 7 is a schematic, three-dimensional, exploded view of first preferred embodiment having sliding drive arms, without showing a casing.

FIG. 5, FIG. 6, and FIG. 7 show a preferred embodiment of the invention wherein FIG. 5 is a longitudinal section taken from line 5—5 of FIG. 6, FIG. 6 is a cross section taken from line 6—6 of FIG. 5, and FIG. 7 is a schematic illustration of said embodiment without showing the casing in an exploded, three-dimensional manner. The embodiment is divided into three parts for ease of description: an input unit, inertial mass media, and an output unit. The input unit comprises an input shaft 60 which is rotatably mounted on a casing 76 through a bearing 71, and is rotatable around an axis of rotation 73; and four identical sliding drive arms 61 fixedly and radially mounted on input shaft 60. The inertial mass media comprises four identical inertial masses 62 each of which has a bore 77 thereon for slidably and drivably coupling said inertial mass 62 onto a sliding drive arm 61; and four identical cylindrical connecting rods 63. The output unit comprises an outer drum guiding gear 64; an output shaft 65 which is rotatably mounted on casing 76 through a bearing 72, and is rotatable around axis of rotation 73; four identical inner guiding gears 66 each of which is rotatable around its axis of rotation 74, having a cylindrical bore 75 in between its circumference and its axis of rotation 74; a pair of identical inner guiding gear supporting members 67; another pair of identical inner guiding gear supporting members 70 (only shown in FIG. 7); four identical inner guiding gear mounting shafts 68; and two identical inner guiding gear supporting member mounting sleeves 69.

Input shaft 60 is rotatably mounted on casing 76 through bearing 71. Sliding drive arms 61 are fixedly and radially mounted on input shaft 60. Each of inertial masses 62 is slidably coupled to a drive arm 61 through bore 77 so that inertial mass 62 is slidable along the length of drive arm 61. Sliding drive arm 61 and bore 77 have substantially same shape of cross sections that are not circular, so that when slidably and snugly mounted onto sliding drive arm 61 through bore 77, inertial mass 62 will not rotate axially around drive arm 61. Outer drum guiding gear 64 is fixedly mounted on output shaft 65, having a same axis of rotation 73 as that of output shaft 65. Outer drum guiding gear 64 has teeth constructed on the inner cylindrical surface thereof. Each pair of inner guiding gear supporting members 67, 70 are rotatably mounted on output shaft 65 through a mounting sleeve 69. Each of mounting sleeves 69 is fixedly mounted on a pair of inner guiding gear supporting members 67, 70, and rotatably mounted on output shaft 65. Each of inner guiding gears 66 is rotatably mounted on an inner guiding gear supporting member 67, 70 through an inner guiding gear mounting shaft 68. Each of inner guiding gears 66 engages outer drum guiding gear 64, and has axis of rotation 74 parallel to axis of rotation 73 of output shaft 65. Mounting shafts 68 are fixedly mounted on supporting members 67, 70. One end of each of cylindrical connecting rods 63 is fixedly mounted on an inertial mass 62. The other end of said connecting rod 63 is rotatably fitted into a bore 75 which is at an area between the circumference and axis of rotation 74 of an inner guiding gear 66. Cylindrical connecting rods 63 are mounted in a position parallel to axis of rotation 73 of output shaft 65. The function of a connecting rod 63 is to keep the connected bore 75 of an inner guiding gear 66 and the connected inertial mass 62 rotating at a same angular speed, while accommodating the ever changing positional relationship between said inner guiding gear 66 and said inertial mass 62. Output shaft 65 is rotatably mounted on casing 76 through bearing 72.

In FIG. 7, a pair of inner guiding gear supporting members 70 are clearly shown which is not shown in FIG. 5 and FIG. 6. As clearly shown in FIG. 7, bores 75 on inner guiding gears 66 carried by inner guiding gear supporting members 70 are closer to axis of rotation 73 than bores 75 on inner guiding gears 66 carried by the other inner guiding gear supporting members 67. It is preferred to arrange so that all bores 75 do not reach the near point to axis of rotation 73 at the same time, but rather, when two opposite bores 75 reach the near point, the other two opposite bores 75 reach the far point, as clearly shown in FIG. 6 and FIG. 7.

In FIG. 6, although not in the plane of the section, the relative positions of input shaft 60, sliding drive arms 61, and inertial masses 62 are also shown, but in broken lines.

As clearly shown in FIG. 6 and FIG. 7, four drive arms 61 are perpendicular to each other so that they are evenly separated.

It is also preferred that outer drum guiding gear 64 has an even number of teeth so that each pair of opposite inner guiding gears 66 operate in a symmetrical manner.

Figure 8:
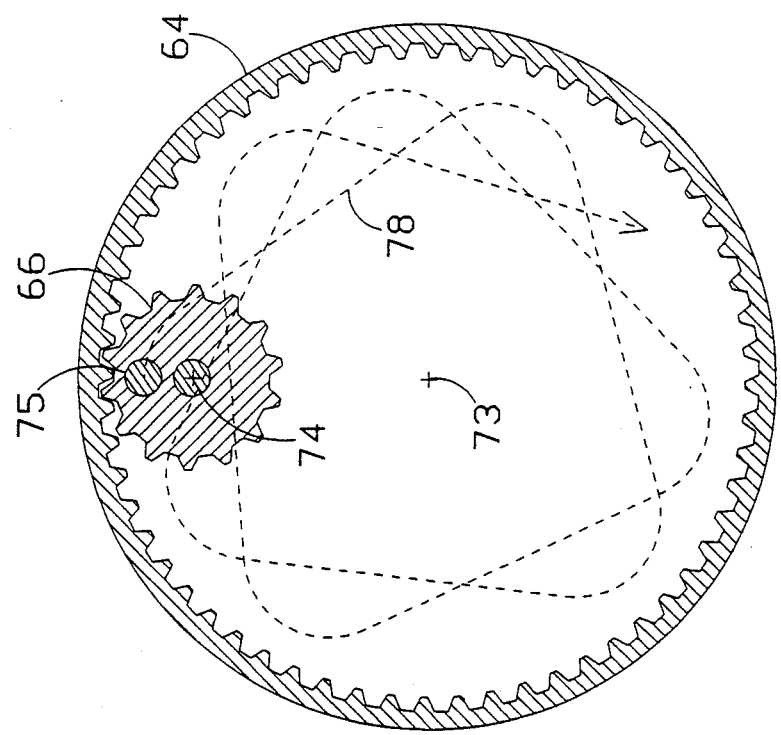
FIG. 8 schematically shows the path of an inertial mass of first preferred embodiment.

Input shaft 60 imports rotational energy from a rotational energy source (not shown) and causes sliding drive arms 61 to rotate. Sliding drive arms 61 in turn cause inertial masses 62 to gyrate. Inertial masses 62 in turn through cylindrical connecting rods 63 and bores 75 cause inner guiding gears 66 to rotate around axis of rotation 73 of output shaft 65. The path along which an inertial mass 62 travels is illustrated in FIG. 8, wherein one inner guiding gear 66 is shown engaging outer drum guiding gear 64. When the input rotation is clockwise and outer drum guiding gear 64 is stationary, inner guiding gear 66 rotates around axis of rotation 73 of output shaft 65 in a clockwise direction, and at the same time, due to the engagement with outer drum guiding gear 64, rotates about its own axis 74 in a counter clockwise direction. Bore 75 on inner guiding gear 66 will follow a path depicted by a broken line 78, along which the distance to axis of rotation 73 of output shaft 65 varies. Since one end of connecting rod 63 is rotatably mounted inside bore 75 and the other end of said connecting rod 63 is fixedly mounted on an inertial mass 62, said inertial mass 62 will travel in exactly the same path as that of said bore 75. Hence broken line 78 also represents the path along which an inertial mass 62 travels. The arrow in FIG. 8 indicates the direction of movement of bore 75 and inertial mass 62. Without outer drum guiding gear 64, inner guiding gear 66 will not rotate about its own axis 74, and said path of bore 75 and inertial mass 62 will become a circle along which the distance to axis of rotation 73 of output shaft 65 will not change. A causal relationship is then obvious: Outer drum guiding gear 64 causes inertial mass 62 to travel in a path along which the distance to axis of rotation 73 of output shaft 65 varies. As a result, an unidirectional torque is generated on outer drum guiding gear 64 around axis of rotation 73. Since said torque is unidirectional and outer drum guiding gear 64 is fixedly mounted on output shaft 65, said torque can be exported through output shaft 65 directly without aid of one-way clutches.

It is obvious that the guiding system that guides inertial mass 62 in the embodiment shown in FIG. 5, FIG. 6, and FIG. 7 is trackless. Inertial mass 62 is guided into going a designated path 78 (in FIG. 8) not by a guiding track.

To avoid running into each other of inner guiding gears 66, and to ensure the smoothness of path 78 in FIG. 8, it is preferred that the diameter of inner guiding gear 66 is not greater than a third of the diameter of outer drum guiding gear 64, and the distance from the center of cylindrical bore 75 to axis of rotation 74 of inner guiding gear 66 is not more than a quarter of the diameter of inner guiding gear 66.

To reduce friction, swinging drive arms can be used in place of sliding drive arms. Without showing the casing, FIG. 9 schematically illustrates an embodiment wherein swinging drive arms are used, in an exploded, three-dimensional manner. The embodiment in FIG. 9 has a swinging drive arm mounting plate 80, four identical swinging drive arm mounting pivots 81, four identical swinging drive arms 82, four identical inertial masses 83, four identical inertial mass mounting pivots 84, four identical cylindrical connecting rods 85. All other parts of the embodiment in FIG. 9 are shared by the embodiment shown in FIG. 5, FIG. 6, and FIG. 7.

Swinging drive arms 82 are pivotally mounted to input shaft 60 through swinging drive arm mounting plate 80 and swinging drive arm mounting pivots 81. Mounting plate 80 is fixedly mounted on input shaft 60. Inertial masses 83 are pivotally mounted on swinging drive arms 82 through mounting pivots 84 so that each of inertial masses 83 is rotatable around a pivot 84 but will not move linearly against a corresponding swinging drive arm 82. One end of each of cylindrical connecting rods 85 is fixedly mounted on an inertial mass 83. The other end of said connecting rod 85 is rotatably and slidably fitted into bore 75 on an inner guiding gear 66 to keep both bore 75 of said inner guiding gear 66 and said inertial mass 83 rotating at a same angular speed, while accommodating an ever changing positional relationship between said inner guiding gear 66 and said inertial mass 83. Cylindrical connecting rod 85 has to be slidably fitted into bore 75 on inner guiding gear 66, because the distance between inertial mass 83 and output shaft 65 is not constant. Cylindrical connecting rod 85 has to slide in and out bore 75 to accommodate the variation of said distance. Since connecting rod 85 is slidably fitted into bore 75, connecting rod 85 has to be long enough to remain at all times inside bore 75. This is the difference between cylindrical connecting rod 85 and cylindrical connecting rod 63 of the embodiment shown in FIG. 5, FIG. 6, and FIG. 7.

While the distance between inertial mass 83 and output shaft 65 keeps on changing, there is nothing to prevent inner guiding gears 66 and mounting sleeves 69 from sliding axially. The amount of possible axial sliding of inner guiding gears 66 and mounting sleeves 69 is the same as the amount of distance variation between inertial mass 83 and output shaft 65. When swinging drive arm 82 is substantially long as shown in FIG. 9, said distance variation is small and hence said axial sliding of inner guiding gears 66 and mounting sleeves 69 is small. A small axial sliding of inner guiding gears 66 and mounting sleeves 69 does not affect the operation of the embodiment. But if swinging drive arm 82 is short, said axial sliding will be substantial, and means should be provided to prevent such axial sliding. Said means could be a pin (not shown) or a collar (not shown) attached to the end of inner guiding gear mounting shaft 68 and the end of output shaft 65.

The swinging drive arms impart less frictional loss than the sliding drive arms do, but take up a little bit more room.

Figure 10:
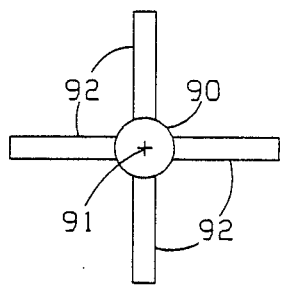
FIG. 10 schematically shows a set of non-biased sliding drive arms.
Figure 11:
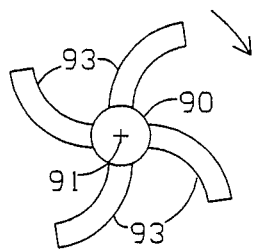
FIG. 11 schematically shows a set of first version of forward biased sliding drive arms.
Figure 12:
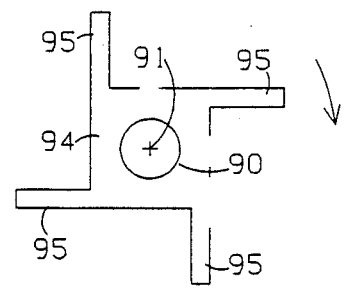
FIG. 12 schematically shows a set of second version of forward biased sliding drive arms.

To make it more efficient, the drive arms can be made forward biased so that when the inertial mass goes outward, it also goes forward. A forward biased drive arm is defined as a drive arm that causes the inertial mass to go forward to the direction of rotation when said inertial mass is going outward away from the axis of rotation. FIG. 10 schematically shows a set of non-biased sliding drive arms just for comparison, wherein 90 is an input shaft, 91 is an axis of rotation, 92 is a non-biased sliding drive arm. FIG. 11 schematically shows a set of forward biased sliding drive arms, wherein 90 is the input shaft, 91 is the axis of rotation, 93 is a forward biased drive arm, and an arrow indicates the direction of rotation. It is obvious that forward biased drive arm 93 bends to the direction of rotation so that when an inertial mass (not shown) slides outward, it also slides forward. FIG. 12 schematically shows a set of another version of forward biased sliding drive arms, wherein 90 is the input shaft, 91 is the axis of rotation, 94 is a drive arm mounting plate, 95 is a forward biased sliding drive arm, and an arrow indicates the direction of rotation. It is also obvious that drive arm 95 bends to the direction of rotation.

Figure 13:
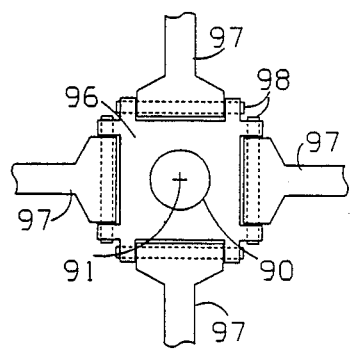
FIG. 13 schematically shows a set of non-biased swinging drive arms.
Figure 14:
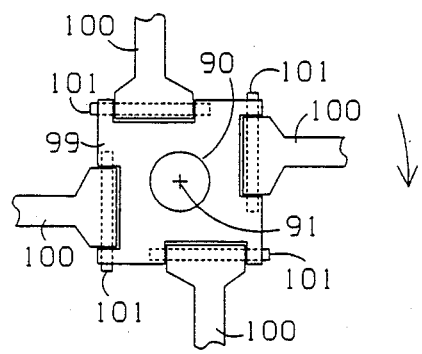
FIG. 14 schematically shows a set of forward biased swinging drive arms.

FIG. 13 schematically shows a set of non-biased swinging drive arms just for comparison, wherein 90 is the input shaft, 91 is the axis of rotation, 96 is a drive arm mounting plate, 97 is a nonbiased swinging drive arm, and 98 is a pivot that mounts swinging drive arm 97 onto drive arm mounting plate 96. FIG. 14 schematically shows a set of forward biased swinging drive arms, wherein 90 is the input shaft, 91 is the axis of rotation, 99 is a drive arm mounting plate, 100 is a forward biased swinging drive arm, 101 is a pivot that mounts forward biased swinging drive arm 100 onto drive arm mounting plate 99, and an arrow indicates the direction of rotation. It is also obvious that when drive arm 100 swings outward, it also swings forward to the direction of rotation, bringing an inertial mass (not shown) with it.

Figure 15:
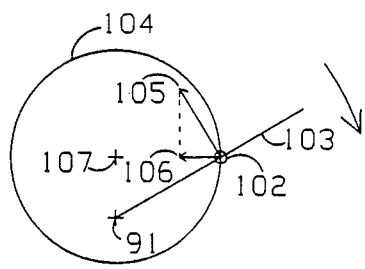
FIG. 15 explains how offsetting effect of torque occurs with a non-biased drive arm.
Figure 16:
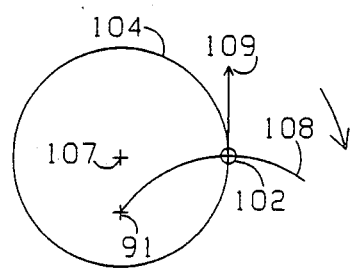
FIG. 16 explains how offsetting effect of torque diminishes with a forward biased drive arm.

The reason for the higher efficiency of forward biased drive arms is explained in FIG. 15 and FIG. 16. FIG. 15 schematically shows a non-biased sliding drive arm in operation, wherein 91 is the axis of rotation, 103 is a non-biased sliding drive arm, 102 is an inertial mass, 104 is an eccentrically mounted circular track, 107 is the center of circular track 104, and an arrow indicates the direction of rotation. As indicated in FIG. 15, inertial mass 102 is travelling through a portion of track 104 where the distance to axis of rotation 91 is decreasing. Inertial mass 102 is forced to decelerate by drive arm 103. A force 105 is exerted on inertial mass 102 by drive arm 103. Force 105 has a divisional force 106 that points to center 107 of circular track 104, offsetting the effect of inertial mass 102 on track 104. In other words, this divisional force 106 is counter productive, because it reduces the torque that can be produced by inertial mass 102 on track 104.

FIG. 16 schematically shows a forward biased sliding drive arm in operation, wherein 91 is the axis of rotation, 102 is the inertial mass, 108 is a forward biased sliding drive arm, 104 is the eccentrically mounted circular track, 107 is the center of circular track 104, and an arrow indicates the direction of rotation. As indicated in FIG. 16 inertial mass 102 is traveling through a portion of track 104 where the distance to axis of rotation 91 is decreasing. Inertial mass 102 is forced to decelerate by drive arm 108. A force 109 is exerted on inertial mass 102 by drive arm 108. Since drive arm 108 is forward biased, force 109 will point to a direction so that it will not have a divisional force that points to center 107 of track 104. In other words, there is no offsetting of the torque produced on track 104 by inertial mass 102.

Forward biased drive arms are more efficient in a way that they make it possible to reduce the size of the transmission or reduce the rate of rotation without reducing the magnitude of the torque generated.

Figure 18:
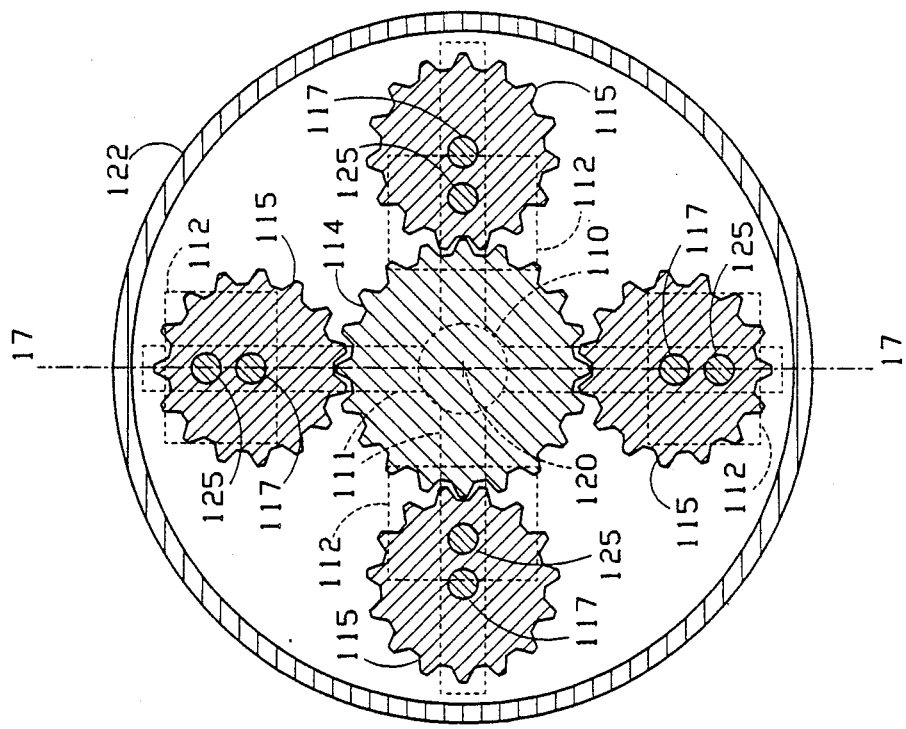
FIG. 18 is a cross section of second preferred embodiment taken from line 18—18 of FIG. 17.
Figure 17:
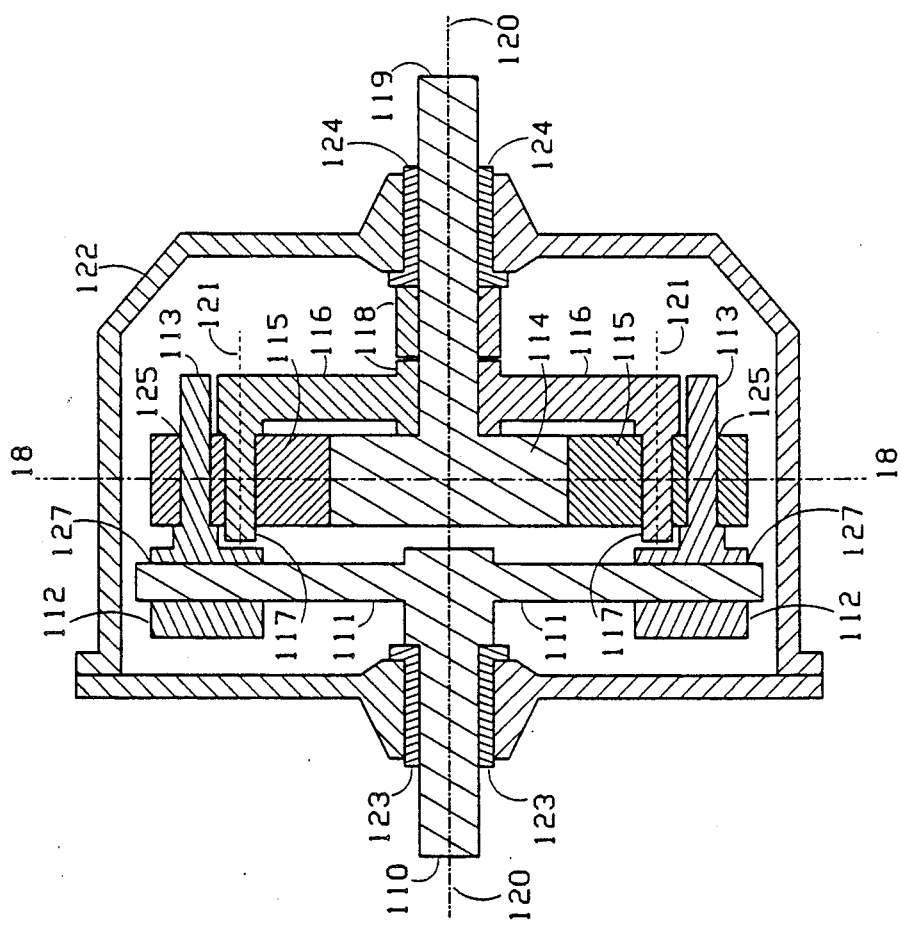
FIG. 17 is a longitudinal section of second preferred embodiment taken from line 17—17 of FIG. 18.

FIG. 17 and FIG. 18 show another preferred embodiment of the invention, wherein FIG. 17 is a longitudinal section taken from line 17—17 of FIG. 18 and FIG. 18 is a cross section taken from line 18—18 of FIG. 17. The embodiment in FIG. 17 and FIG. 18 has an input shaft 110, four identical sliding drive arms 111, four identical inertial masses 112, four identical cylindrical connecting rods 113, a central guiding gear 114, four identical peripheral guiding gears 115, a pair of identical peripheral guiding gear supporting members 116 shown (there is another pair not shown), four identical peripheral guiding gear mounting shafts 117, two identical peripheral guiding gear supporting member mounting sleeves 118, an output shaft 119, a casing 122, a bearing 123 for rotatably mounting input shaft 110 onto casing 122, a bearing 124 for rotatably mounting output shaft 119 onto casing 122, an axis of rotation 120 of output shaft 119 and input shaft 110, an axis of rotation 121 of each of peripheral guiding gears 115, a cylindrical bore 125 on each of peripheral guiding gears 115 for rotatably coupling a cylindrical connecting rod 113 to a peripheral guiding gear 115, a bore 127 on each of inertial masses 112 for slidably and drivably coupling an inertial mass 112 onto a sliding drive arm 111.

Input shaft 110 is rotatably mounted on casing 122 through bearing 123. Sliding drive arms III are radially and fixedly mounted on input shaft 110. Inertial masses 112 are slidably and snugly fitted onto drive arms 111 through bores 127. Drive arm 111 has a non-circular cross section that has substantially same shape as that of bore 127, so that when slidably and snugly fitted onto said drive arm 111 through bore 127, inertial mass 112 will not rotate axially around drive arm 111. Central guiding gear 114 is fixedly mounted on output shaft 119, having an axis of rotation common to axis of rotation 120 of output shaft 119. Peripheral guiding gear supporting members 116 are rotatably mounted on output shaft 119 through mounting sleeves 118 which are fixedly mounted on supporting members 116 and rotatably mounted on output shaft 119. Peripheral guiding gears 115 are rotatably mounted on supporting members 116 through peripheral guiding gear mounting shafts 117, engaging central guiding gear 114, having axes of rotation 121 parallel to axis of rotation 120 of output shaft 119. Mounting shafts 117 are fixedly mounted on supporting members 116. Cylindrical bore 125 on a peripheral guiding gear 115 is located in an area between the circumference and axis of rotation 121 of said peripheral guiding gear 115, for rotatably coupling one end of a connecting rod 113 to said peripheral guiding gear 115. The other end of said connecting rod 113 is fixedly mounted on an inertial mass 112. Said connecting rod 113 is mounted in a position parallel to axis of rotation 120 of output shaft 119. The function of a connecting rod 113 is to keep the connected cylindrical bore 125 of a peripheral guiding gear 115 and the connected inertial mass 112 rotating at a same angular speed, while accommodating the ever changing positional relationship between said guiding gear 115 and said inertial mass 112. Output shaft 119 is rotatably mounted on casing 122 through bearing 124.

In FIG. 18, although not in the plane of the section, the relative positions of input shaft 110, sliding drive arms 111, and inertial masses 112 are also shown, but in broken lines. As clearly shown in FIG. 18, the four drive arms 111 are perpendicular to each other; central guiding gear 114 has an even number of teeth to accommodate symmetrical operation of peripheral guiding gears 115; and two inertial masses 112 in opposite sides of axis of rotation 120 reach the far points to said axis of rotation 120, while the other two inertial masses 112 reach the near points to said axis of rotation 120.

It is preferred that the diameter of peripheral guiding gear 115 is not greater than the diameter of central guiding gear 114, and the distance between the center of bore 125 and axis of rotation 121 of peripheral guiding gear 115 is not greater than one-fourth of the diameter of peripheral guiding gear 115, to prevent running into each other of peripheral guiding gears 115.

Figure 19:
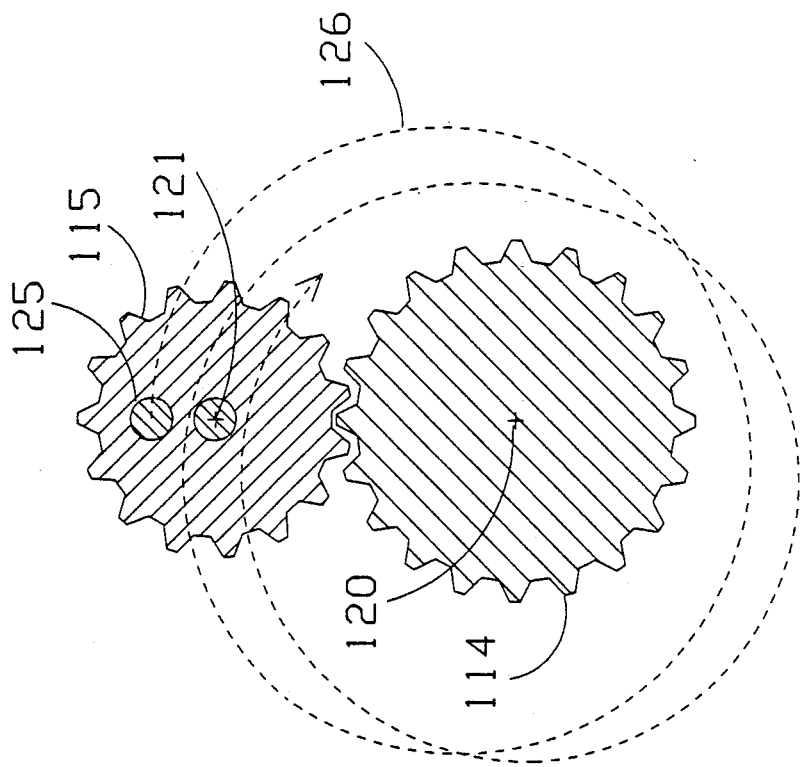
FIG. 19 schematically shows the path of an inertial mass of second preferred embodiment.

Input shaft 110 imports rotational energy from a rotational energy source (not shown) and causes sliding drive arms 111 to rotate. Sliding drive arms 111 in turn cause inertial masses 112 to gyrate. Inertial masses 112 in turn through cylindrical connecting rods 113 and cylindrical bores 125 cause peripheral guiding gears 115 to rotate around axis of rotation 120 of output shaft 119. The path along which an inertial mass 112 travels is illustrated in FIG. 19, wherein one peripheral guiding gear 115 is shown engaging central guiding gear 114. When the input rotation is clockwise and central guiding gear 114 is stationary, peripheral guiding gear 115 rotates around axis of rotation 120 of output shaft 119 in a clockwise direction, and at the same time, due to the engagement with central guiding gear 114, rotates about its own axis of rotation 121 in a clockwise direction. Bore 125 on peripheral guiding gear 115 will follow a path depicted in a broken line 126, along which the distance to the axis of rotation 120 of output shaft 119 varies. Since one end of connecting rod 113 is rotatably mounted inside said bore 125 and the other end of said connecting rod 113 is fixedly mounted on an inertial mass 112, said inertial mass 112 will travel in exactly the same path as that of said bore 125. Hence broken line 126 also represents the path along which said inertial mass 112 travels. The arrow in FIG. 8 indicates the direction of movement of said bore 125 and said inertial mass 112. Without central guiding gear 114, peripheral guiding gear 115 will not rotate about its own axis of rotation 121, and said path of bore 125 and inertial mass 112 will become a circle along which the distance to axis of rotation 120 of output shaft 119 will not change. A causal relationship is then obvious: central guiding gear 114 causes inertial mass 112 to travel in a path along which the distance to axis of rotation 120 of output shaft 119 varies. As a result, an unidirectional torque is generated on central guiding gear 114 around axis of rotation 120. Since said torque is unidirectional and central guiding gear 114 is fixedly mounted on output shaft 119, said torque can be exported through output shaft 119 directly without aid of one-way clutches.

It is obvious that the guiding system that guides inertial mass 112 in the embodiment shown in FIG. 17 and FIG. 18 is trackless. Inertial mass 112 is guided into going a designated path 126 (in FIG. 19) not by a tangible guiding track.

Thus the reader will see that the inertial masses mediated rotational energy coupler of the invention provides a very simple, very rugged, highly functional, and highly efficient device for automobiles and wherever transmission of rotational energy is needed.

While my above description contains many specificities, these should not be construed as limitations on the scope of the invention, but rather as an exemplification of a few preferred embodiments thereof. Many other variations are possible. Accordingly, the scope of the invention should be determined not by the embodiments illustrated, but by the appended claims and their legal equivalents.

What is claimed is:

1. An inertial masses mediated rotational energy coupler, comprising:
   (a) an input means for importing rotational energy, comprising: an input shaft rotatably mounted on a casing through first bearing means, a plurality of drive arms radially mounted on said input shaft;
   (b) a plurality of inertial masses drivably coupled to said drive arms;
   (c) a direct output means for exporting rotational energy directly without aid of one-wa clutches, comprising: an output shaft rotatably mounted on said casing through second bearing means, trackless guiding means mounted on said output shaft to guide said inertial masses; said trackless guiding means comprising: an outer drum guiding gear fixedly mounted on said output shaft, and a plurality of inner guiding gears engaging said outer drum guiding gear;
   (d) said inertial masses arranged to connect to said trackless guiding means and arranged to be drivable around the axis of rotation of said output shaft by said drive arms, in paths set forth by said output shaft through said trackless guiding means so that along said paths distance to the axis of rotation of said output shaft varies.

2. An inertial masses mediated rotational energy coupler, comprising:
  (a) an input means for importing rotational energy, comprising: an input shaft rotatably mounted on a casing through first bearing means, a plurality of drive arms radially mounted on said input shaft;
  (b) a plurality of inertial masses drivably coupled to said drive arms;
  (c) an output means for exporting rotational energy, comprising: an output shaft, an outer drum guiding gear having teeth constructed on inner cylindrical surface thereof, a plurality of inner guiding gears, and a plurality of inner guiding gear supporting members; said output shaft rotatably mounted on said casing through second bearing means, said outer drum guiding gear fixedly mounted on said output shaft, having an axis of rotation common to the axis of rotation of said output shaft, said inner guiding gear supporting members rotatably mounted on said output shaft, said inner guiding gears rotatably mounted on said inner guiding gear supporting members, engaging said outer drum guiding gear, having axes of rotation parallel to the axis of rotation of said output shaft;
  (d) each of said inertial masses arranged to connect to one of said inner guiding gears at an area between the axis and the circumference of said inner guiding gear, and arranged to be drivable around the axis of rotation of said output shaft by one of said drive arms, in a path set forth by said output shaft through said outer drum guiding gear and said inner guiding gear so that along said path distance to the axis of rotation of said output shaft varies.

3. An inertial masses mediated rotational energy coupler as defined in claim 2, wherein said drive arms are sliding drive arms fixedly mounted on said input shaft, said inertial masses are slidably coupled to said sliding drive arms.

4. An inertial masses mediated rotational energy coupler as defined in claim 2, wherein said drive arms are forwardly biased sliding drive arms fixedly mounted on said input shaft, said inertial masses are slidably coupled to said forwardly biased sliding drive arms.

5. An inertial masses mediated rotational energy coupler as defined in claim 2, wherein said drive arms are swinging drive arms pivotally mounted on said input shaft.

6. An inertial masses mediated rotational energy coupler as defined in claim 2, wherein said drive arms are forwardly biased swinging drive arms pivotally mounted on said input shaft.

7. An inertial masses mediated rotational energy coupler, comprising:
  (a) an input means for importing rotational energy, comprising: an input shaft rotatably mounted on a casing through first bearing means, a plurality of drive arms radially mounted on said input shaft;
  (b) a plurality of inertial masses drivably coupled to said drive arms;
  (c) an output means for exporting rotational energy, comprising: an output shaft, a central guiding gear, a plurality of peripheral guiding gears, and a plurality of peripheral guiding gear supporting members; said output shaft rotatably mounted on said casing through second bearing means, said central guiding gear fixedly mounted on said output shaft, having an axis of rotation common to the axis of rotation of said output shaft, said peripheral guiding gear supporting members rotatably mounted on said output shaft, said peripheral guiding gears rotatably mounted on said peripheral guiding gear supporting members, engaging said central guiding gear, having axes of rotation parallel to the axis of rotation of said output shaft;
  (d) each of said inertial masses arranged to connect to one of said peripheral guiding gears at an area between the axis and circumference of said peripheral guiding gear, and arranged to be drivable around the axis of rotation of said output shaft by one of said drive arms, in a path set forth by said output shaft through said central guiding gear and said peripheral guiding gear so that along said path distance to the axis of rotation of said output shaft varies.

8. An inertial masses mediated rotational energy coupler as defined in claim 7, wherein said drive arms are sliding drive arms fixedly mounted on said input shaft, said inertial masses are slidably coupled to said sliding drive arms.

9. An inertial masses mediated rotational energy coupler as defined in claim 7, wherein said drive arms are forwardly biased sliding drive arms fixedly mounted on said input shaft, said inertial masses are slidably coupled to said forwardly biased sliding drive arms.

10. An inertial masses mediated rotational energy coupler as defined in claim 7, wherein said drive arms are swinging drive arms pivotally mounted on said input shaft.

11. An inertial masses mediated rotational energy coupler as defined in claim 7, wherein said drive arms are forwardly biased swinging drive arms pivotally mounted on said input shaft.

* * * * *